US012656477B2

(12) United States Patent
Richards et al.

(10) Patent No.: US 12,656,477 B2
(45) Date of Patent: Jun. 16, 2026

(54) SYSTEMS AND METHODS FOR MOTION ESTIMATION

(71) Applicant: THRUWAVE INC., Seattle, WA (US)

(72) Inventors: Elina B. Richards, Seattle, WA (US); Daniel Arnitz, Seattle, WA (US); Andreas Pedross-Engel, Seattle, WA (US); Matthew S. Reynolds, Seattle, WA (US)

(73) Assignee: THRUWAVE INC., Seattle, WA (US)

( * ) Notice: Subject to any disclaimer, the term of this patent is extended or adjusted under 35 U.S.C. 154(b) by 273 days.

(21) Appl. No.: 18/554,533

(22) PCT Filed: Mar. 31, 2022

(86) PCT No.: PCT/US2022/022749
§ 371 (c)(1),
(2) Date: Oct. 9, 2023

(87) PCT Pub. No.: WO2022/216511
PCT Pub. Date: Oct. 13, 2022

(65) Prior Publication Data
US 2024/0192358 A1      Jun. 13, 2024

Related U.S. Application Data

(60) Provisional application No. 63/173,318, filed on Apr. 9, 2021.

(51) Int. Cl.
G01S 13/86      (2006.01)
G01S 13/88      (2006.01)
G01S 13/90      (2006.01)

(52) U.S. Cl.
CPC .......... G01S 13/867 (2013.01); G01S 13/881 (2013.01); G01S 13/9064 (2019.05)

(58) Field of Classification Search
CPC .. G01S 13/867; G01S 13/881; G01S 13/9064; G01S 13/89; G01S 7/40; G06T 7/20; H04N 19/513
See application file for complete search history.

(56) References Cited

U.S. PATENT DOCUMENTS

| | | | |
|---|---|---|---|
| 5,227,800 A | 7/1993 | Huguenin et al. | |
| 5,444,490 A | 8/1995 | De With et al. | |

(Continued)

FOREIGN PATENT DOCUMENTS

| | | | |
|---|---|---|---|
| CN | 111144238 A | 5/2020 | |
| CN | 112305542 B | 10/2023 | |

(Continued)

OTHER PUBLICATIONS

International Search Report and Written Opinion issued for PCT/US2022/022749, mailed on Jun. 14, 2022, xx pages, by U.S. International Search Authority.

(Continued)

*Primary Examiner* — Jack W Keith
*Assistant Examiner* — Clayton Paul Ridder
(74) *Attorney, Agent, or Firm* — Perkins Coie LLP

(57)      ABSTRACT

The present application is directed to a video-based motion extraction system that uses mmWave imaging. In one example, an object velocity is extracted in real time from at least one motion vector obtained from a compressed video. The velocity information is combined with distance information obtained from a distance sensor. The combination of distance and velocity is used to calculate a position of the object at each time instance. A velocity profile may be generated. The velocity profile may then be used to reconstruct an image of an object passing in front of an mmWave antenna array.

20 Claims, 10 Drawing Sheets

(56) References Cited

U.S. PATENT DOCUMENTS

| | | | |
|---|---|---|---|
| 5,642,393 | A | 6/1997 | Krug et al. |
| 7,183,963 | B2 | 2/2007 | Lee et al. |
| 8,350,747 | B2 | 1/2013 | DeLia et al. |
| 9,123,093 | B1 | 9/2015 | Schumacher |
| 10,782,404 | B2 | 9/2020 | Safavi-Naeini et al. |
| 11,379,693 | B1 | 7/2022 | Fry |
| 12,184,122 | B2 | 12/2024 | Kelly |
| 2002/0032515 | A1 | 3/2002 | Nakamura et al. |
| 2005/0104603 | A1 | 5/2005 | Peschmann et al. |
| 2006/0066728 | A1 | 3/2006 | Batur |
| 2006/0214835 | A1 | 9/2006 | Lee et al. |
| 2007/0009085 | A1 | 1/2007 | Otani et al. |
| 2007/0230657 | A1 | 10/2007 | Garms |
| 2008/0152082 | A1 | 6/2008 | Bouchard et al. |
| 2009/0002220 | A1 | 1/2009 | Lovberg et al. |
| 2009/0175411 | A1 | 7/2009 | Gudmundson et al. |
| 2009/0284405 | A1 | 11/2009 | Salmon et al. |
| 2010/0005044 | A1 | 1/2010 | Bowring et al. |
| 2011/0181300 | A1 | 7/2011 | Bowring et al. |
| 2015/0186839 | A1 | 7/2015 | Chen et al. |
| 2015/0323664 | A1 | 11/2015 | Wu et al. |
| 2016/0252646 | A1 | 9/2016 | Sarraiocco |
| 2016/0264255 | A1 | 9/2016 | Connor et al. |
| 2016/0275441 | A1 | 9/2016 | Barber et al. |
| 2016/0356886 | A1 | 12/2016 | Valdes et al. |
| 2018/0173161 | A1 | 6/2018 | Chen et al. |
| 2019/0019316 | A1 | 1/2019 | Govindasamy et al. |
| 2019/0139441 | A1* | 5/2019 | Akella .................... G09B 19/00 |
| 2019/0146500 | A1* | 5/2019 | Yalla .................. G01C 21/3407 701/25 |
| 2019/0182499 | A1 | 6/2019 | Richert |
| 2019/0277999 | A1 | 9/2019 | Chen et al. |
| 2019/0383927 | A1 | 12/2019 | Mihajlovic et al. |
| 2020/0171548 | A1 | 6/2020 | Li et al. |
| 2020/0191913 | A1 | 6/2020 | Zhang et al. |
| 2020/0320731 | A1 | 10/2020 | Sheen |
| 2020/0344470 | A1* | 10/2020 | Shen ................... H04L 43/0894 |
| 2021/0109206 | A1* | 4/2021 | Li ........................... G01S 13/06 |
| 2021/0133666 | A1 | 5/2021 | Eckman et al. |
| 2021/0364629 | A1 | 11/2021 | Ryder et al. |
| 2022/0057519 | A1 | 2/2022 | Goldstein et al. |
| 2022/0230366 | A1 | 7/2022 | Hallgren et al. |
| 2022/0404294 | A1 | 12/2022 | Takayama et al. |
| 2023/0079634 | A1 | 3/2023 | Reynolds et al. |

FOREIGN PATENT DOCUMENTS

| | | | |
|---|---|---|---|
| CN | 107015222 | B | 6/2024 |
| DE | 102013011239 | A1 | 1/2015 |
| JP | 10153655 | A | 6/1998 |
| JP | H10-153655 | H | 6/1998 |
| JP | 2006267102 | A | 10/2006 |
| JP | 2007218661 | A | 8/2007 |
| JP | 2008007324 | A | 1/2008 |
| WO | 2017159521 | A1 | 9/2017 |
| WO | 2018147929 | A2 | 8/2018 |
| WO | 2020027591 | A1 | 2/2020 |

OTHER PUBLICATIONS

Liu et al. "Blind image restoration with sparse priori regularization for passive millimeter-wave images." Journal of Visual Communication and Image Representation 40 (2016): 58-66. Jun. 15, 2016 (Jun. 15, 2016) Retrieved on May 23, 2022 (May 23, 2022) from <https://www.sciencedirect.com/science/article/abs/pii/S1047323016300980> entire document.

Notice of Rejection issued in Japanese Patent Application No. 2023-562264 mailed Apr. 16, 2024.

European Search Report for European Patent Application No. 22792183.0 dated Oct. 17, 2024, 9 pages.

Japanese Notice of Allowance issued for Japanese Patent Application No. 2023-562264 and mailed Oct. 1, 2024.

Japanese Notice of Allowance issued for Japanese Patent Application No. 2023-562267 on Jun. 4, 2024.

Japanese Notice of Allowance issued for Japanese Patent Application No. 2023-564385 on Aug. 3, 2024.

Japanese Notice of Rejection issued for Japanese Patent Application No. 2023-562264 mailed Apr. 16, 2024.

Japanese Notice of Rejection issued for Japanese Patent Application No. 2023-562267 mailed Feb. 27, 2024.

Japanese Notice of Rejection issued for Japanese Patent Application No. 2023-564385 mailed Mar. 19, 2024.

European communication issued for European Patent Application No. 22785180.5 dated May 6, 2025, 4 pages.

European Search Report issued for European Patent Application No. 22785180.5 dated Sep. 6, 2024, 10 pages.

Supplemental European Search Report issued by the European Patent Office for European Application No. 22785179.7 dated Jan. 8, 2025, 22 pages.

Supplemental European Search Report issued by the European Patent Office for European Application No. 22785179.7 dated Oct. 17, 2024, 17 pages.

Shchepetilnikov et al., "New Ultra-Fast Sub-Terahertz Linear Scanner for Postal Security Screening", International Journal of Infrared and Millimeter Waves, May 7, 2020, retrieved from internet <http://terasense.com/wp-content/uploads/2020/10/New-Ultra-Fast-Sub-Terahertz-Linear-Scanner.pdf> entire document.

International Search Report and Written Opinion issued for PCT/US2022/022754, mailed on Jul. 29, 2022, 13 pages, by U.S. International Search Authority.

International Search Report and Written Opinion issued for PCT/US2022/022757, mailed on Jun. 24, 2022, xx pages, by U.S. International Search Authority.

Pedross-Engel et al., "A Two-Sided Reflection-Based K-Band 3-D Millimeter-Wave Imaging Sisystem With Image Beat Patter Mitigation," IEEE Transactions on Microwave Theory and Techniques, vol. 69, No. 11, Nov. 2021 downloaded from the Internet <https://ieeexplore.ieee.org/document/9442356> downloaded on May 28, 2022 (May 28, 2022), date of publication May 29, 2021 (May 29, 2021) entire document, especially Fig.1-10; pp. 5046-5049.

\* cited by examiner

Horizontal Velocity Across Target (Frame #20)

horizontal flow [pixels/frame]

Horizontal Velocity Across Target (Frame #2)

horizontal flow [pixels/frame]

Position Error using Velocity Estimate (3 Examples)

Velocity Estimate and Ground Truth (3 Examples)

Velocity profiles corresponding to different real-world scenarios

Nearly constant velocity, no correction

Increasing/decreasing velocity, no correction

Slowly increasing velocity, no correction

Nearly constant velocity, with motion correction

Increasing/decreasing velocity, with motion correction

Slowly increasing velocity, with motion correction

1000

1002

| Processing units 1004 | Working memory 1006 |

| I/O devices 1010 | Storage memory 1008 |

1020

| BIOS 1026 | OS 1022 | Local programs 1024 |

1040

| Interface 1042 | Imaging Module 1044 | Velocity Extraction Module 1046 |

| Velocity Profile Module 1048 | Image Reconstruction Module 1050 |

SYSTEMS AND METHODS FOR MOTION ESTIMATION

CROSS-REFERENCE TO RELATED APPLICATION

This application claims the benefit of and priority to U.S. Provisional Patent Application No. 63/173,318, filed Apr. 9, 2021, the disclosure of which is incorporated herein by reference in its entirety.

TECHNICAL FIELD

The present disclosure relates to systems and methods for estimating motion from video for high-throughput lens-less 3-D millimeter wave imaging.

SUMMARY

Lens-less millimeter-wave (mmWave) imaging of moving objects using a sparse array relies on knowledge of the relative positions between the moving object and the imaging system to enable coherent image reconstruction. However, accurate object position information is rarely available in commercial applications where the moving object, e.g. a conveyor belt or a robot, is controlled independently of the imaging system, or where the imaged objects move autonomously. This may pose a hurdle for many commercial mmWave imaging applications.

As such, there is an increased need for systems and methods that can address the challenges of mmWave imaging of objects when accurate object position information is unavailable due to object movement that is controlled independently of the imaging system.

In some embodiments, a system for producing millimeter wave images can include a video camera operative to capture video frames of a moving object, a millimeter wave antenna array proximate to the video camera and operative to capture millimeter wave data frames, and a motion vector processor. In some embodiments, the motion vector processor can be configured to calculate one or more motion vectors using the video frames, wherein the one or more motion vectors represent relative motion between the video camera and the object. The system can include at least one of a position processor and a velocity processor, wherein the position processor is configured to calculate one or more position estimates, and the velocity processor is configured to calculate one or more velocity estimates, of the object relative to the millimeter wave antenna array using the one or more motion vectors. The system can also include an image reconstruction processor configured to calculate a millimeter wave image of the object using the millimeter wave data frames and at least one of the corresponding position and velocity estimates.

In some aspects of the disclosed technology, the video camera produces a compressed video dataset. In some aspects, the one or more motion vectors are extracted from the compressed video dataset. In various aspects, the compressed video dataset comprises an MPEG video dataset. In some aspects, the millimeter wave image comprises a three-dimensional image of the object. In some aspects of the technology, the position and velocity estimates are interpolated between the video frames. In various aspects, the object is transported via one of a conveyor belt or a robot. In some aspects, the object is stationary, and the video camera and the millimeter wave antenna array are transported by a moving platform 104. In some aspects, the moving platform 104 comprises a mobile robot. In some aspects, the relative motion between the video camera and the object comprises a non-constant velocity.

In some embodiments, a method for producing a millimeter wave image of a moving object can include capturing two or more video frames of the moving object using a video camera proximate to a millimeter wave antenna array and capturing two or more millimeter wave data frames using the millimeter wave antenna array. The method can include calculating one or more motion vectors representing the relative motion between the video camera and the object and calculating at least one of one or more position estimates and one or more velocity estimates of the object relative to the millimeter wave antenna array using the motion vectors. The method can also include calculating the millimeter wave image using the millimeter wave data frames and the corresponding at least one of the position estimates and the velocity estimates using an image reconstruction algorithm.

In some embodiments, a method for estimating motion of an object in a video can include receiving at least one recording of an object passing in front of an mmWave antenna array and calculating at least one velocity associated with the object, wherein the velocity is calculated based on at least one motion vector. The method can include receiving, from a distance sensor, at least one distance indicator associated with the object, and combining the at least one velocity and the at least one distance indicator. The method can also include, based on the combination of the at least one velocity and the at least one distance indicator, generating a velocity profile of the object and constructing at least one image based on the velocity profile of the object.

It is with respect to these and other general considerations that the aspects disclosed herein have been made. Also, although relatively specific problems may be discussed, it should be understood that the examples should not be limited to solving the specific problems identified herein.

DETAILED DESCRIPTION

Figure 1:
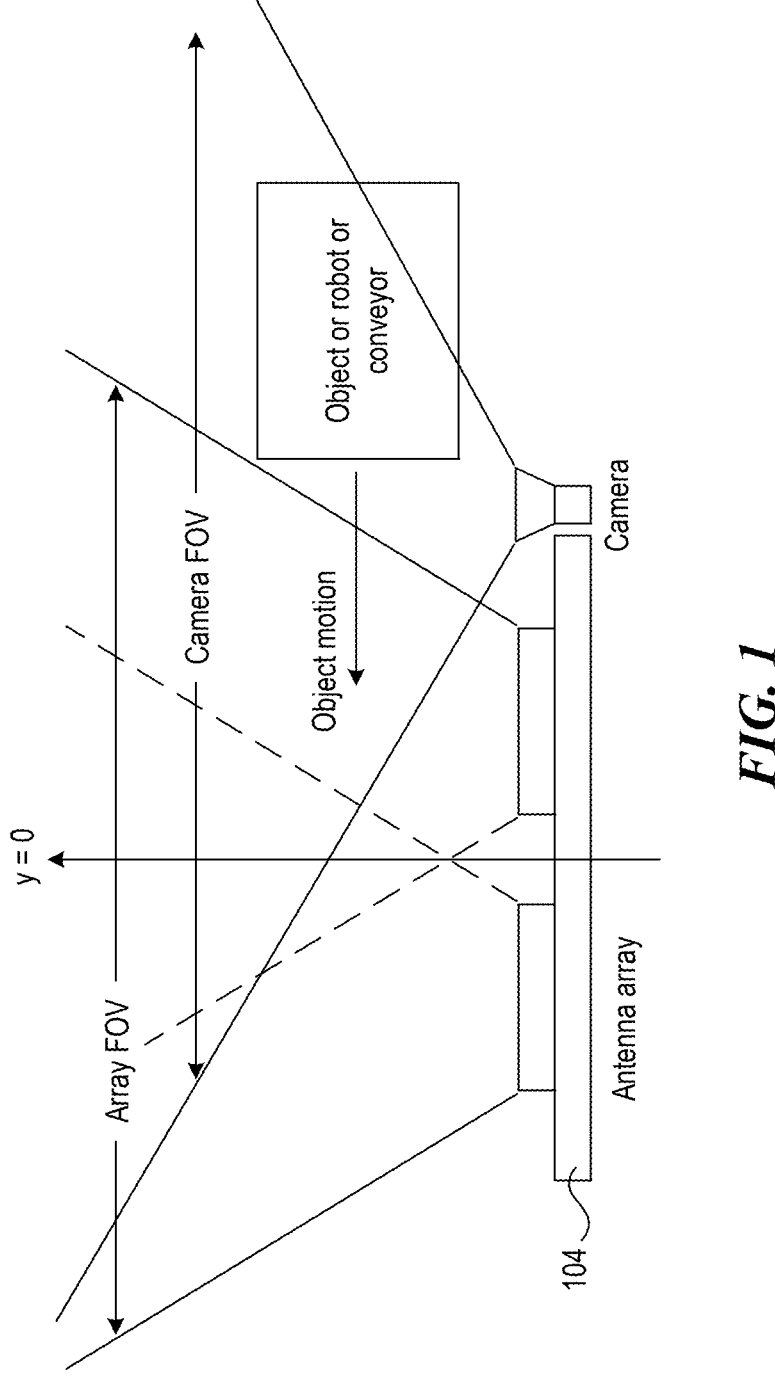
FIG. 1 is an example mmWave antenna array and camera configuration, showing the fields of view of each component and the path of the object to be imaged as it passes in front of the array.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

A video-based motion extraction approach for active mmWave imaging is presented. In one example, the object velocity is extracted in real time from motion vectors obtained from a compressed video. This information may be combined with readouts from a distance sensor to infer the position of the object at each time instant. Leveraging video-derived motion vectors may enable the offloading of computational complexity of 2-D spatial correlations to highly optimized algorithms operating on camera frames.

The image quality of a commercial high-throughput 3-D mmWave imaging system may be improved by this approach when the velocity of the target is unknown and time-varying. Additionally, image quality may also be improved compared to known average motion profiles of the imaged objects.

In one example, the Root Mean Square (RMS) position error may be 2.5 mm over a travel length of 0.52 m. This may provide benefits which include achieving an error of less than ⅛ of the wavelength at K-band (24 GHZ) along the trajectory and thus sufficient to achieve improved image quality at K-band and longer wavelengths.

The region of the electromagnetic spectrum known as millimeter-waves (mmWaves) comprises the wavelengths between 1 and 20 mm, corresponding to a frequency range of 15 to 300 GHZ. Imaging performed with mmWaves may offer advantages compared to either optical or X-ray wavelengths. Many materials which are opaque at optical wavelengths, such as drywall, cardboard, and many plastics, are largely transparent to mmWaves, offering the opportunity to image areas that would otherwise be hidden, for example behind walls or within sealed packaging or containers. Furthermore, in contrast to X-rays, mmWaves are non-ionizing electromagnetic waves, which makes them safe for humans without the need for cumbersome and expensive shielding.

These properties make mmWave imaging an ideal choice for many commercial and industrial applications. While previous implementations of lens-less computational mmWave imaging systems were limited to a relatively low frame rates (e.g. 0.25 Hz), recent advances in the design of mmWave imagers have opened up 3-D mmWave imaging for high-throughput applications. For example, mmWave imagers can be used in warehouse settings to look inside packaged goods to count objects, detect anomalies such as missing or damaged items or liquid leakage, or to estimate void space inside packages to ensure efficient shipping in commerce.

In a warehouse or industrial application, for example, where mmWaves are being used to image a succession of moving objects, accurate position information of each object relative to the imaging system may be helpful to the production of high quality images. In such an application, the object being scanned is typically transported by a conveyor belt or robot, whose motion is not controlled by the imaging system, and whose velocity may not be constant. Therefore, it may be advantageous to measure the motion of the object over the time interval of each mmWave scan, so the appropriate motion correction can be applied to the mmWave image reconstruction to ensure that the mmWave image is properly focused throughout the duration of the scan.

A video-based motion extraction approach is described herein. A camera located near the mmWave antenna array may record the scene (or scenes) as the object passes in front of the array. The object velocity is then extracted in real time from motion vectors derived from the compressed video. This information is combined with readouts from a distance sensor to infer the precise position of the object at each time instant over the imaging interval. An output of a velocity profile, which is used in the image reconstruction to produce a high quality image, may be generated.

Example Imaging System

FIG. 1 is an example mmWave antenna array and camera configuration, showing the fields of view of each component and the path of the object to be imaged as it passes in front of the array. An example of a 3-D mmWave imaging hardware system may be used in conjunction with the motion estimation system discussed below with respect to FIGS. 3A and 3B. This imaging system consists of 32 K-band multiple-input multiple-output (MIMO) mmWave sub-arrays, positioned in two 1-D vertical arrays of 16 sub-arrays each. The columns of sub-arrays are positioned along the side of a conveyor, which transports the objects to be imaged in front of the entire array at an average speed of 0.3 m/s. The two columns are positioned adjacent to each other with a separation of 160 mm parallel to one side of the conveyor and span a vertical length of 1800 mm. Note that the two columns are slightly offset in z by 50 mm. However, both columns form a single logical array. An optical trigger sensor is used to trigger a measurement when an object passes by. An optical camera located adjacent to the array records the video that will be used for the motion estimation. A diagram of the imaging system is shown in FIG. 1.

This setup is designed to closely model a commercial package-scanning application, in which the objects to be imaged are transported via a conveyor belt or robot along a path parallel to an mmWave sensor array. While this particular setup uses a conveyor belt to supply motion, modern warehouses may use autonomous robots to transport goods between locations. An autonomous robot may calculate an optimal path through the warehouse to complete its assigned task. It may also adjust its motion to optimize traffic flow, to adapt to differing weight of products, and to avoid collisions. As a result, some robots will move with the same velocity, while others may have different velocity profiles, and the velocity of an individual robot may vary as it passes the imaging array. This non-constant velocity may be modeled by varying the speed of the conveyor belt, thus permitting a robotic system to be simulated in a conveyor-based test setup.

Motion Estimation System

Motion vectors are found in many types of video systems, including comprising an element of MPEG-format video compression. A motion vector is a 2-dimensional vector that represents the change in coordinates of a block of pixels from one frame to the next. They are related to the optical flow of the image frames, which is the apparent motion resulting from the projection of the 3-dimensional scene onto the 2-dimensional image. Motion vectors may be a convenient proxy for representing the optical flow because they are a sparse representation of the scene (and thus faster to analyze compared to the optical flow) and because they can be readily extracted directly from the compressed MPEG data. For these reasons, the extraction of motion vectors from compressed MPEG data has found many applications in object detection and tracking.

A video camera is located adjacent to the antenna array, such that the field of view of the camera overlaps with field of view of the antenna array, as shown in FIG. 1. Video may be recorded in MPEG4 format at 59 frames per second (fps), with a resolution of 1440×1080 pixels. Lens correction may be applied, after which the video is re-encoded to 20 fps. The choice of video frame rate involves trade-offs between quantization noise in the motion vectors and distortion effects. Quantization noise is present because the motion vectors represent a shift in position over a number of pixels; a lower frame rate may produce a larger shift between frames, which reduces the effect of this quantization. However, a larger shift may also increase the effect of changes due to perspective, uneven light conditions, and lens distortions; hence a low frame rate may reduce the correlation between frames and may introduce more noise.

Figure 2:
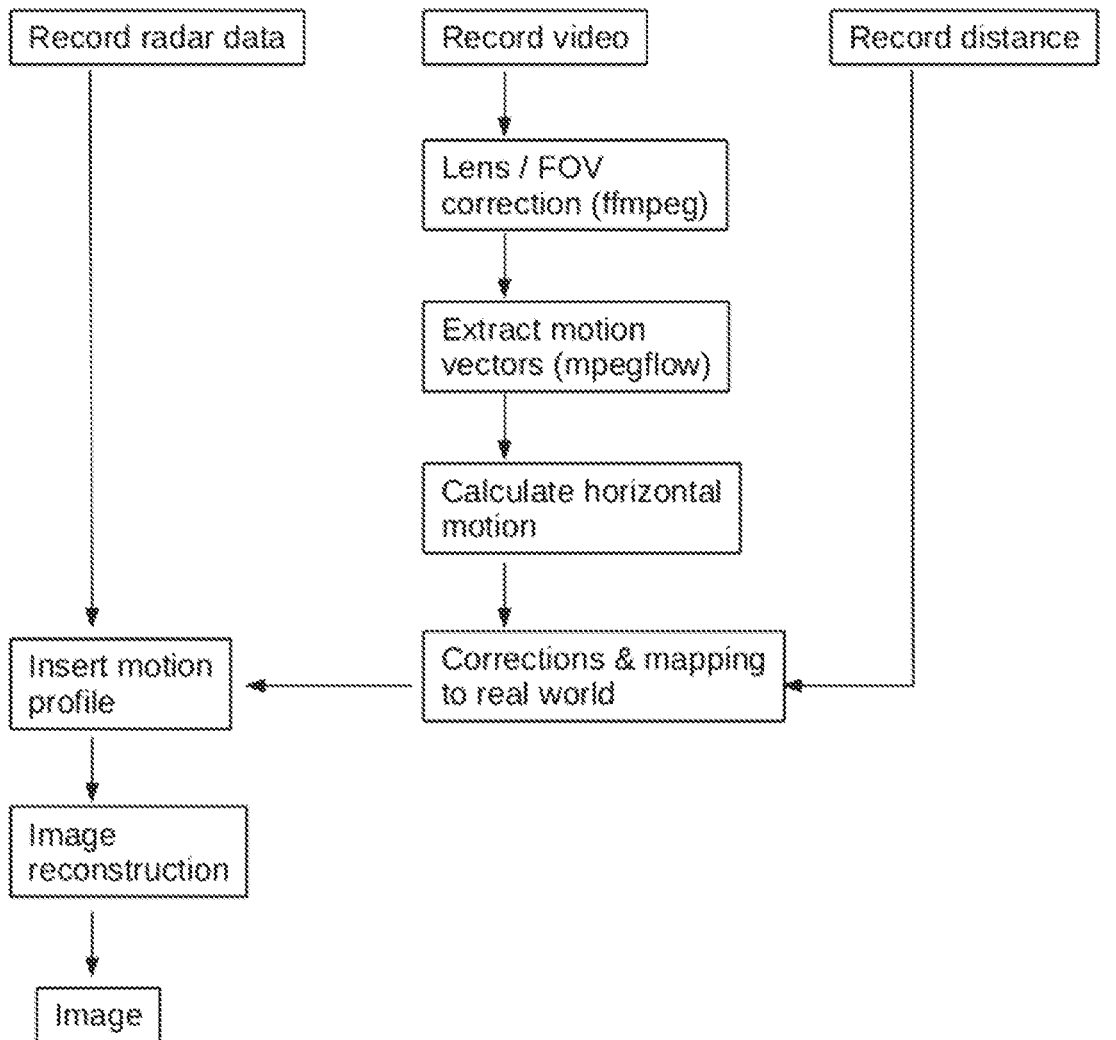
FIG. 2 is an example flowchart depicting the processing steps for incorporating distance and motion data into the mmWave image reconstruction.

FIG. 2 is an example flowchart depicting the processing steps for incorporating distance and motion data into the mmWave image reconstruction. The video image processing system may use ffmpeg and mpegflow as readily available tools to perform lens correction and extract motion vectors; alternatively, it would be possible to perform lens correction on the motion vectors directly. Frames are recorded over the interval of the mmWave scan, and motion vectors corresponding to the velocity of the scene are extracted for each frame. Compared to using break-beam sensors to detect the motion of the scene, this approach may enable continuous observations over the entire duration of the imaging scan, which in turn may allow for the correction of time-varying motion, whereas break-beam sensors or similar position detectors can only produce an average velocity over the sensor spacing. FIG. 2 shows the process by which video data is converted to a motion profile and incorporated into the image reconstruction.

Figures 3A, 3B:
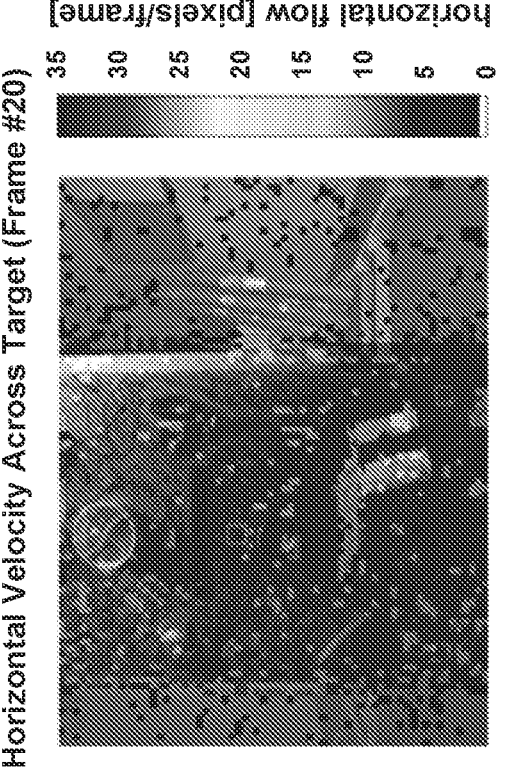
FIGS. 3A and 3B illustrate an example horizontal velocity as measured across the field of view for frames taken at two different times during a single measurement.

FIGS. 3A and 3B illustrate an example horizontal velocity as measured across the field of view for frames taken at two different times during a single measurement. After motion vectors have been extracted from the camera frames using mpegflow, the overall velocity of the object is estimated by taking a quantile average over areas with consistent motion and applying a correction factor derived from a training data set.

Using a quantile rather than an overall average reduces the effect of unavoidable noise due to low correlation between frames, for example when an object enters or exits the camera's field of view. When there is low correlation, the motion vector can jump in any direction because there might be a pixel block with randomly better correlation in a different direction. Considering only a quantile average helps eliminate the poorly correlated motion vectors. In addition, by using a high quantile instead of the median, the algorithm uses the front surface of the object rather than parts of the field of view which are placed further back, as points at a greater distance will appear to move at slower speeds due to perspective.

FIG. 3 shows two sample frames from a camera capture, with an overlay of the estimated horizontal speed across the field of view. In this test, the object velocity increased to a peak of 0.4 m/s and then decreased over the time interval of the measurement. The difference in estimated velocity between the two frames is evident. Additionally, it is possible to observe the presence of distortions; the estimated velocity is not constant over the area of the target. Using only a high quantile of the motion vectors to estimate the overall velocity minimizes the error that would be induced by these distortions.

Figure 4:
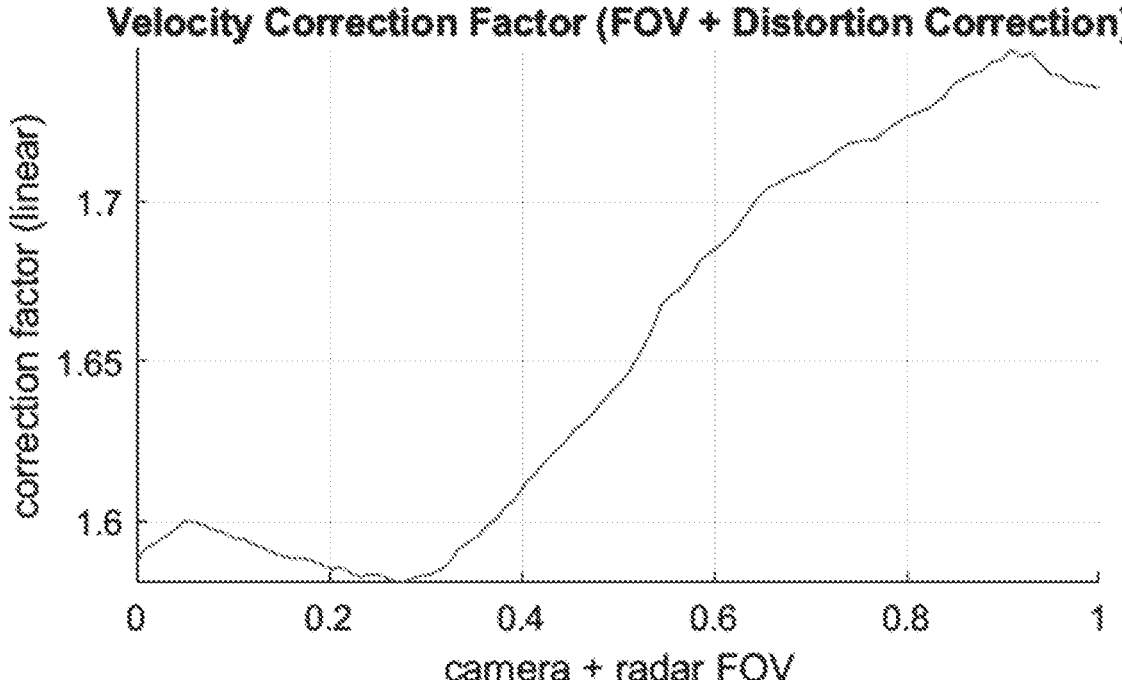
FIG. 4 is an example graph depicting the correction factor as a function of the estimated velocity.

FIG. 4 is an example graph depicting the correction factor as a function of the estimated velocity. As shown in FIG. 1, the camera is offset from the radar array along the axis parallel to the conveyor, and the field of view of the camera is not identical to the field of view of the radar. As a result, the motion profile obtained by analysis of the camera frames may not be directly applied to the radar data; to compensate for the different fields of view, a correction to the motion profile may be applied.

To estimate the correction factor, a training set with 50 randomly-generated velocity profiles and known ground truth may be used. FIG. 4 shows the resulting correction factor as a function of the velocity estimated from the camera data. This correction factor also translates from pixels per frame, as measured by the motion vectors, to a velocity in mm/s as observed by the mmWave imaging system.

Image Reconstruction

For the purpose of reconstructing an image from the mmWave data, the scene being observed is modeled as a collection of N point scatterers, each with a complex reflection coefficient $\rho_n$. The mmWave antenna array consists of M pairs of transmitting and receiving antennas. For each position $m \in \{1, \ldots, M\}$ and for each frequency $l \in \{1, \ldots, L\}$, the received signal $y_{m,l}$ is the sum of the reflections from point scatterers comprising the scene:

$$y_{m,l} = \sum_n^N c_{m,l,n} e^{-j\omega_l \tau_{m,n}} \rho_n + v_{m,l}, \tag{1}$$

where $c_{m,l,n}$ represents the path loss and antenna response, $\omega_l$ is the angular frequency, $\tau_{m,n}$ is the round-trip time delay between antenna position m and the n-th point scatter, $v_{m,l}$ is measurement noise, and $j=\sqrt{-1}$.

The measurement vector for a single antenna pair m over frequencies l can be written as $y_m$. Expressing $y_m$ as elements of the vector $$y = \begin{bmatrix} y_1^T & \cdots & y_M^T \end{bmatrix},$$

and $\rho_n$ as $\rho = [\rho_n \ldots \rho_N]^T$, where $(\bullet)^T$ denotes the transpose operator, the vector can be written as $$y = H\rho + v, \tag{2}$$

where H is the measurement matrix giving the dependency between the point scatterers and each measurement, and $\upsilon$ is measurement noise.

The goal of the image reconstruction process is to estimate the complex reflectivity coefficients of the points comprising the scene. This is accomplished by solving the inverse problem defined in (2). While this may not be solved exactly, an estimate $\hat{\rho}$ can be obtained by approximating the inverse using the matched filter of H, $$\hat{\rho} = H * y, \tag{3}$$

where $(\cdot)$ * denotes the complex conjugate transpose operator.

The value of each round-trip time delay t depends on precise knowledge of the relative positions of the antenna array and the points forming the scene. Given a known location $y_0$ of the object at time $t_0=0$, when the measurement is triggered, the position of the object relative to the array at subsequent frames can be found by integrating the velocity profile. For a discrete set of velocity measurements $v(t_n)$, taken at times $t_n$ the position of the object at the corresponding times is given by $$y(t_n) = y_0 + \sum_1^n v(t_{n-1})(t_n - t_{n-1}). \tag{4}$$

The mmWave imaging array captures data frames at times $t_m$, which are different from the set of times $t_n$ forming the velocity profile. The set of velocity measurements $v(t_n)$ is interpolated to find $v(t_m)$, in order to obtain the best approximation to the speed at each mmWave frame. The position of the object at mmWave frame m is therefore given by $$y(t_m) = y_0 + \sum_1^m v(t_{m-1})(t_m - t_{m-1}). \tag{5}$$

The number of mmWave data frames is generally much larger than the number of points in the estimated velocity profile over the same time span, therefore there may be no advantage to interpolating the velocity profile to points to points intermediate to $(t_{m-1}, t_m)$.

Results and Discussion

Figures 5A, 5B:
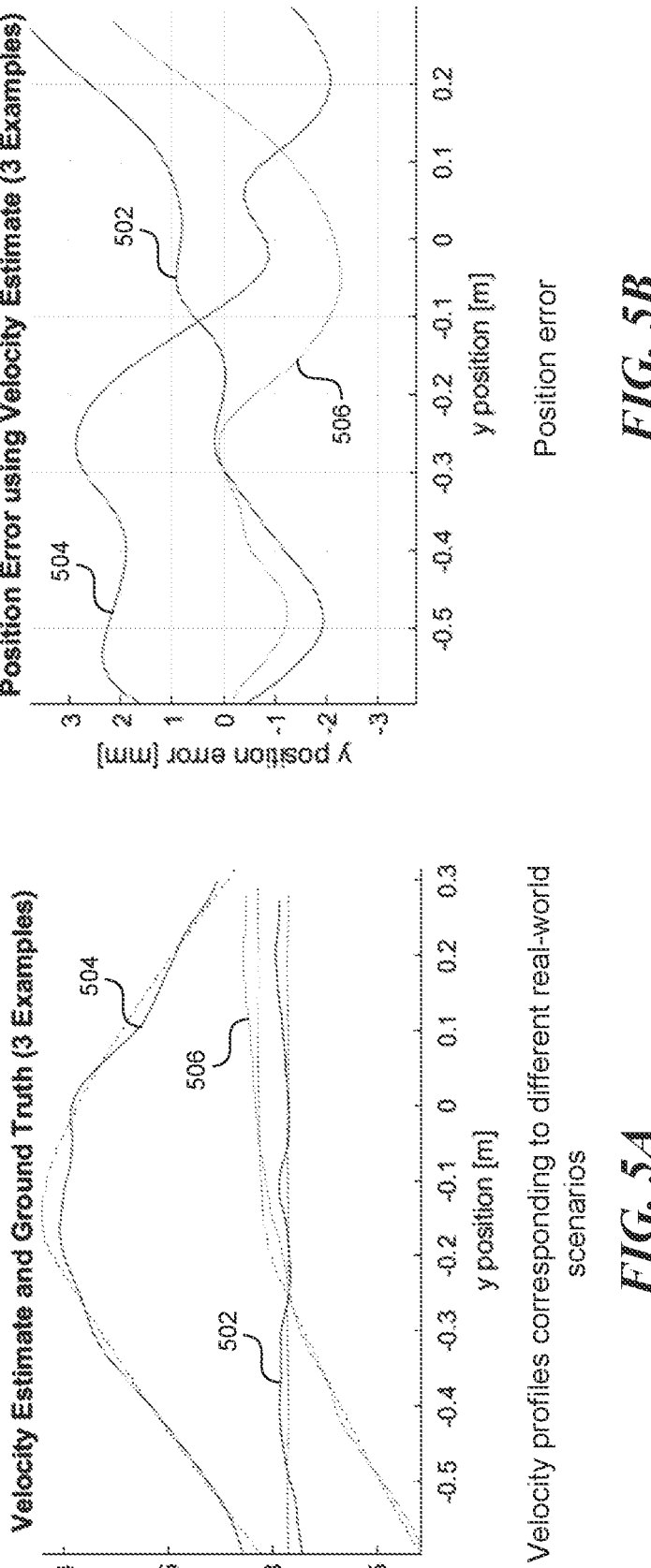
FIGS. 5A and 5B illustrate example graphs of estimated velocity profiles compared to ground truth data and the position error resulting from the discrepancy between real and estimated motion.
Figures 6A, 6B, 6C, 6D, 6E, 6F:
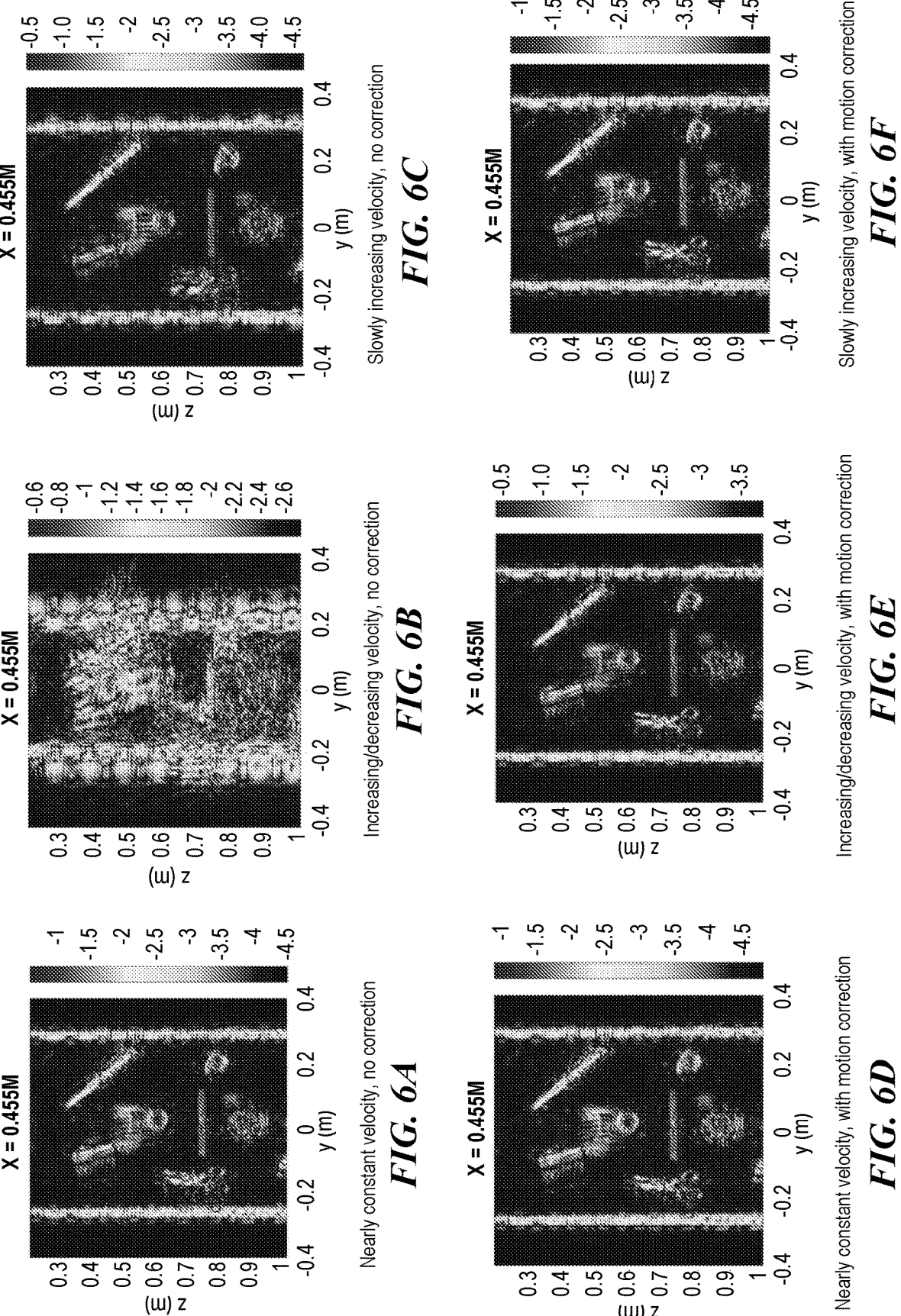
FIGS. 6A-6F illustrate example scenes with and without motion correction for three different velocity profiles, as depicted in FIG. 5.

FIGS. 5A and 5B illustrate example graphs of estimated velocity profiles (solid lines) compared to ground truth data (dashed lines) and the position error resulting from the discrepancy between real and estimated motion. Line 502 represents a profile with approximately constant velocity, line 504 shows a scenario in which the velocity increases and then decreases, and line 506 represents a velocity profile that is slowly increasing. It is illustrative to consider three scenarios for the velocity profile of the imaged object: an object with nearly constant velocity close to 0.3 m/s, an object with uneven velocity, which first increases and then decreases, and an object that increases in speed over the time interval of the measurement. Some of these scenarios may occur in a real-world application, either because of varying conveyor speeds, or because the imaged object is being carried by an autonomous robot whose path and speed adjust to its surroundings. A robot may speed up briefly to avoid a collision or accelerate slowly because it is heavily loaded.

Similarly, a conveyor belt speed may depend on the weight of the objects on the belt, the available power from the drive motor, or in response to control signals from upstream or downstream control systems (such as a programmable logic control, or a warehouse execution system) that control a particular conveyor. FIG. 5a depicts these three velocity profiles as estimated from the data, with the ground truth profiles for reference. FIG. 5b shows the position error resulting from the discrepancy between the estimated velocity and the ground truth.

FIGS. 6A-6F illustrate example scenes with and without motion correction for three different velocity profiles, as depicted in FIG. 5. FIGS. 6A-6F display image reconstructions both with and without motion correction. Image reconstruction without motion correction uses an estimated constant velocity of approximately 0.3 m/s. Image reconstruction with motion correction applies the velocity profiles illustrated in FIG. 5a. Image quality in some cases is improved when the estimated motion is accounted for. The greater the difference in the true motion of the object from the average velocity, the more dramatic the improvement in image quality is.

One measure of image focus is the total power over pixels, (6):

$$P = \sum_{y=0}^{M-1} \sum_{z=0}^{N-1} f(y, z)^2,$$

where f(y,z) represents the image values. The increase in total power for each of the three scenarios when motion estimation is applied is shown in Table 1. The increase in total power, corresponding to the improvement in image focus, is a factor of 1.14 for the case of constant velocity, 2.15 for the case of increasing and decreasing velocity, and 1.08 for the case of slowly increasing velocity. As expected, the second scenario, in which the velocity variation is the greatest, may benefit the most from the motion correction.

TABLE 1

Image power as a measure of focus. The overall power of the image increases with motion correction as a result of improved focus.

|  | Constant | Increase/Decrease | Slow Increase |
|---|---|---|---|
| No correction | $4.3944 \times 10^5$ | $1.4289 \times 10^5$ | $4.7016 \times 10^5$ |
| With correction | $4.9900 \times 10^5$ | $3.0769 \times 10^5$ | $5.0735 \times 10^5$ |

Another measure of image focus is the range of the image histogram, (7):

$$D = \max(h(k)) - \min(h(k)),$$

where h(k) is the number of image pixels with value k. For a histogram of 100 bins between −5 and 0, the motion correction improves this measure of the image focus for some images as shown in Table 2.

TABLE 2

Histogram focus measure indicating sharpening for images with motion correction.

|  | Constant | Increase/Decrease | Slow Increase |
|---|---|---|---|
| No correction | 3251 | 2630 | 2706 |
| With correction | 3274 | 4163 | 3026 |

Figures 7A, 7B:
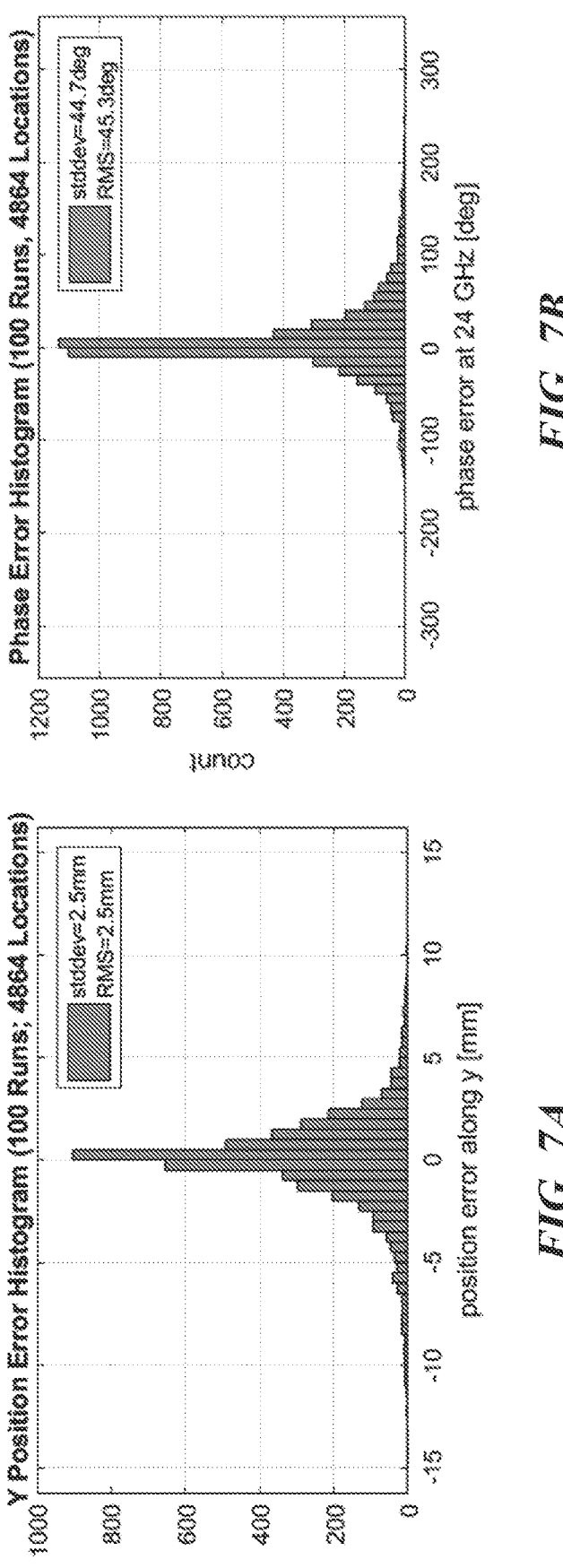
FIGS. 7A and 7B illustrate example graphs depicting accuracy of motion estimation for a verification dataset of one hundred sample images.

FIGS. 7A and 7B illustrate example graphs depicting accuracy of motion estimation for a verification dataset of one hundred sample images. A verification data set was gathered for 100 sample runs using random velocity profiles, and the results have been compiled in FIG. 7. The three illustrative scenarios above form part of this verification data set. In FIG. 7a, it can be seen that the standard deviation of the horizontal position error for these 100 profiles is 2.5 mm over a travel length of 0.52 m. This is better than ⅛ of the wavelength at K-band (24 GHZ) along the trajectory and thus sufficient to achieve excellent image quality at and below this frequency band. The associated phase error is shown in FIG. 7b.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 8:
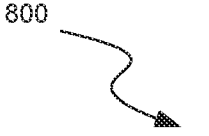
FIG. 8 is a block diagram illustrating an overview of devices on which some implementations of the disclosed technology can operate.
Figure 8:
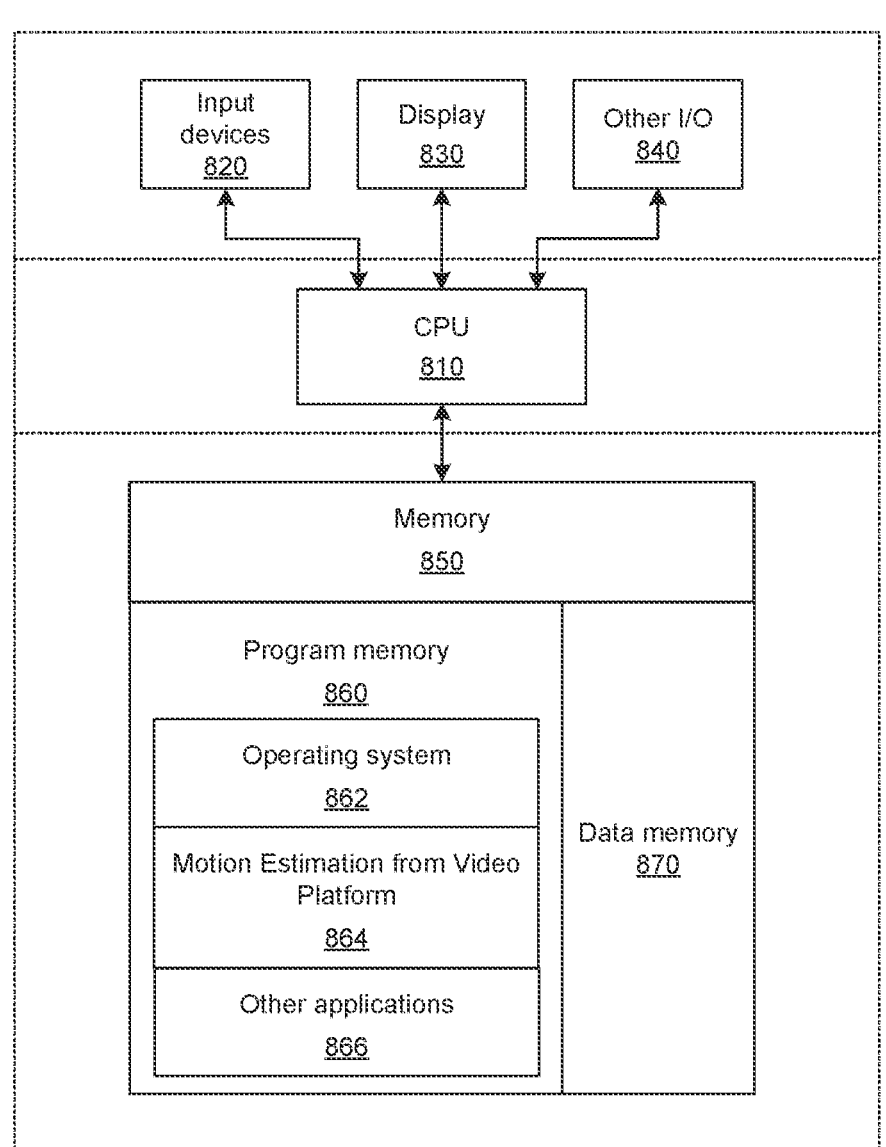

Several implementations are discussed below in more detail in reference to the figures. FIG. 8 is a block diagram illustrating an overview of devices on which some implementations of the disclosed technology can operate. The devices can comprise hardware components of a device 800 that captures mmWave images, for example. Device 800 can include one or more input devices 820 that provide input to the CPU (processor) 810, notifying it of actions. The actions are typically mediated by a hardware controller that interprets the signals received from the input device and communicates the information to the CPU 810 using a communication protocol. Input devices 820 include, for example, a mouse, a keyboard, a touchscreen, a mmWave imaging sensor (e.g., a K-band mmWave imaging sensor operating at or near 24 GHZ), an infrared sensor, a touchpad, a wearable input device, a camera or image-based input device, a microphone, or other user input devices.

CPU 810 can be a single processing unit or multiple processing units in a device or distributed across multiple devices. CPU 810 can be coupled to other hardware devices, for example, with the use of a bus, such as a PCI bus or SCSI bus. The CPU 810 can communicate with a hardware controller for devices, such as for a display 830. Display 830 can be used to display text and graphics. In some examples, display 830 provides graphical and textual visual feedback to a user. In some implementations, display 830 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 840 can also be coupled to the processor, such as a network card, video card, audio card, USB, FireWire or other external device, sensor, camera, printer, speakers, CD-ROM drive, DVD drive, disk drive, or Blu-Ray device. In some examples, I/O devices 840 may also include a control of the velocity of a robotic material handling system or a conveyor belt.

In some implementations, the device 800 also includes a communication device capable of communicating wirelessly or wire-based with a network node. The communication device can communicate with another device or a server through a network using, for example, TCP/IP protocols. Device 800 can utilize the communication device to distribute operations across multiple network devices.

The CPU 810 can have access to a memory 850. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 850 can include program memory 860 that stores programs and software, such as an operating system 862, motion estimation from video platform 864, and other application programs 866. Memory 850 can also include data memory 870 that can include database information, etc., which can be provided to the program memory 860 or any element of the device 800.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 9:
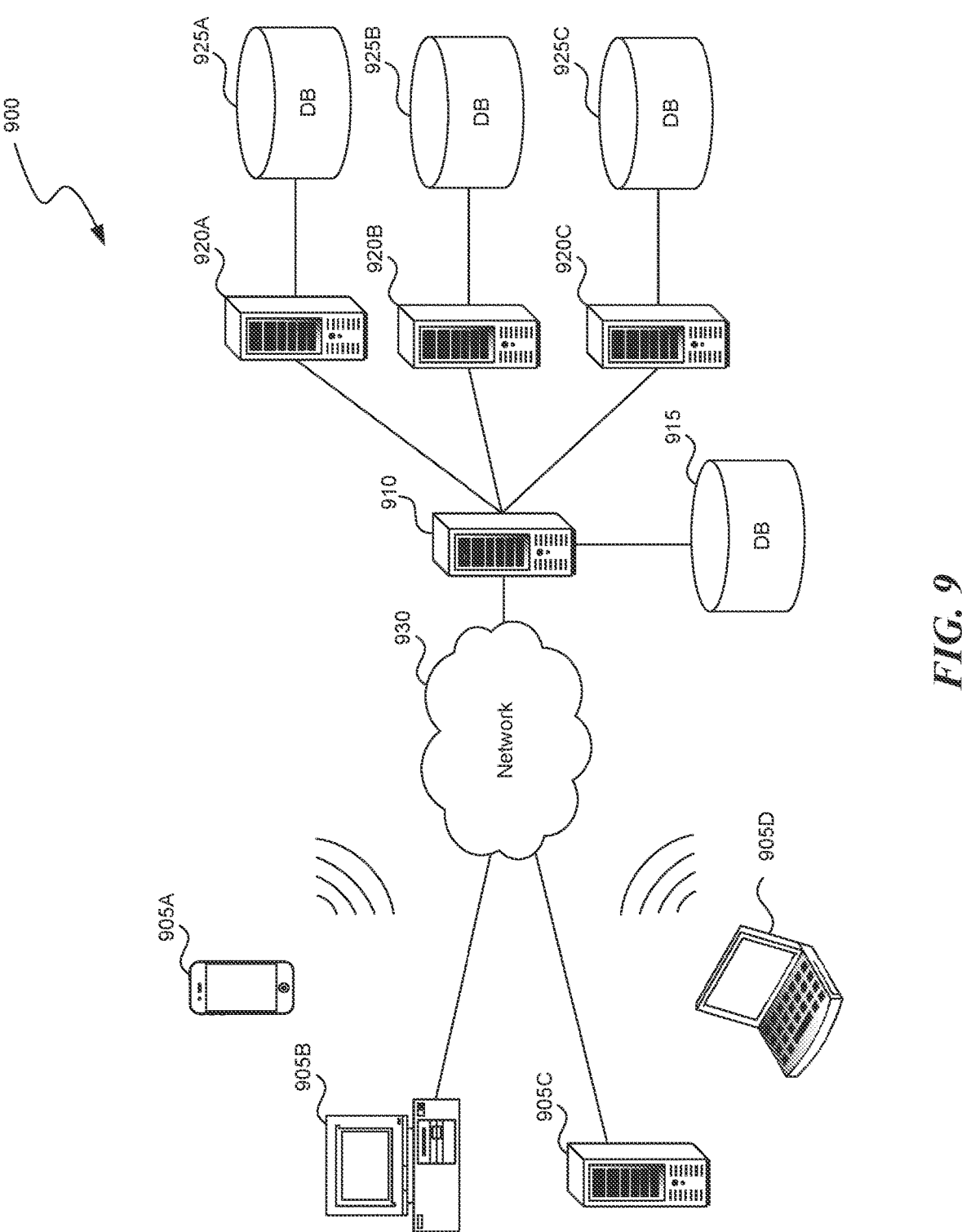
FIG. 9 is a block diagram illustrating an overview of an environment in which some implementations of the disclosed technology can operate.

FIG. 9 is a block diagram illustrating an overview of an environment 900 in which some implementations of the disclosed technology can operate. Environment 900 can include one or more client computing devices 905A-D, examples of which can include device 800. Client computing devices 905 can operate in a networked environment using logical connections through network 930 to one or more remote computers, such as a server computing device 910.

In some implementations, server computing device 910 can be an edge server that receives client requests and coordinates fulfillment of those requests through other servers, such as servers 920A-C. Server computing devices 910 and 920 can comprise computing systems, such as device 1000. Though each server computing device 910 and 920 is displayed logically as a single server, server computing devices can each be a distributed computing environment encompassing multiple computing devices located at the same or at geographically disparate physical locations. In some implementations, each server computing device 920 corresponds to a group of servers.

Client computing devices 905 and server computing devices 910 and 920 can each act as a server or client to other server/client devices. Server 910 can connect to a database 915. Servers 920A-C can each connect to a corresponding database 925A-C. As discussed above, each server 920 can correspond to a group of servers, and each of these servers can share a database or can have their own database. Databases 915 and 925 can warehouse (e.g., store) information. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN), but can also be other wired or wireless networks. Network 930 may be the Internet or some other public or private network. Client computing devices 905 can be connected to network 930 through a network interface, such as by wired or wireless communication. While connections between server 910 and servers 920 are shown as separate connections, these connections can be any kind of local, wide area, wired, or wireless network, including network 930 or a separate public or private network.

Figure 10:
FIG. 10 is a block diagram illustrating components which, in some implementations, can be used in a system employing the disclosed technology.

FIG. 10 is a block diagram illustrating components 1000 which, in some implementations, can be used in a system employing the disclosed technology. The components 1000 include hardware 1002, general software 1020, and specialized components 1040. As discussed above, a system implementing the disclosed technology can use various hardware, including processing units 1004 (e.g., CPUs, GPUs, APUs, etc.), working memory 1006, storage memory 1008, and input and output devices 1010. Components 1000 can be implemented in a client computing device such as client computing devices 1105 or on a server computing device, such as server computing device 910.

General software 1020 can include various applications, including an operating system 1022, local programs 1024, and a basic input output system (BIOS) 1026. Specialized components 1040 can be subcomponents of a general software application 1020, such as local programs 1024. Specialized components 1040 can include an Imaging Module 1044, a Velocity Extraction Module 1046, a Velocity Profile Module 1048, an Image Reconstruction Module 1050, and components that can be used for transferring data and controlling the specialized components, such as interface 1042. In some implementations, components 1000 can be in a computing system that is distributed across multiple computing devices or can be an interface to a server-based application executing one or more of specialized components 1040.

Those skilled in the art will appreciate that the components illustrated in FIGS. 6-8 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

CONCLUSIONS

The results presented here demonstrate that image quality may depend on knowledge of the precise motion of the object being imaged over the field of view of the mmWave imaging system. Quantitative measurements of image focus, such as the total power and the histogram range, may show improvement when the motion profile of the imaged object is taken into account—even when the velocity of the object is close to constant. The degree of improvement may be even greater when larger variations in velocity are present.

In real-world commercial and industrial applications, the objects to be imaged may move at inconsistent speeds for a variety of reasons, and the motion may be accounted for by the radar imaging system in order to produce images. The use of motion vectors extracted from an optical camera located adjacent to the imaging array may yield beneficial results and allow for a variety of velocity profiles to be corrected in real time. A combined motion-estimation and radar imaging system may be utilized for high-throughput scanning applications for scenes of non-constant velocity.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system for producing millimeter wave images, comprising:
    a video camera operative to capture video frames of a moving object,
        wherein the video camera is offset from a radar array that provides radar data;
    a millimeter wave antenna array proximate to the video camera and operative to capture millimeter wave data frames;
    a motion vector processor configured to extract one or more motion vectors from the video frames,
        wherein the one or more motion vectors represent relative motion between the video camera and the object;
    at least one of a position processor and a velocity processor,
        wherein the position processor is configured to determine one or more position estimates of the object relative to the millimeter wave antenna array using the one or more motion vectors,
        wherein the velocity processor is configured to determine one or more velocity estimates of the object relative to the millimeter wave antenna array using the one or more motion vectors, and
        wherein the one or more velocity estimates are determined using a quantile average determined from the one or more motion vectors and a correction factor associated with the radar data, the correction factor obtained from a training dataset comprising randomly generated velocity profiles; and
    an image reconstruction processor configured to reconstruct a millimeter wave image of the object using the millimeter wave data frames and at least one of the corresponding position and velocity estimates.

2. The system of claim 1 wherein the video camera produces a compressed video dataset.

3. The system of claim 2 wherein the one or more motion vectors are extracted from the compressed video dataset.

4. The system of claim 2 wherein the compressed video dataset comprises an MPEG video dataset.

5. The system of claim 1 wherein the millimeter wave image comprises a three-dimensional image of the object.

6. The system of claim 1 wherein the position and velocity estimates are interpolated between the video frames.

7. The system of claim 1 wherein the object is transported via one of a conveyor belt or a robot.

8. The system of claim 1 wherein the object is stationary, and the video camera and the millimeter wave antenna array are transported by a moving platform.

9. The system of claim 8 wherein the moving platform comprises a mobile robot.

10. The system of claim 1 wherein the relative motion between the video camera and the object comprises a non-constant velocity.

11. A method for producing a millimeter wave image of a moving object, the method comprising:

capturing two or more video frames of the moving object using a video camera proximate to a millimeter wave antenna array, the object transported by a conveyor belt or robot, the video camera offset from a radar array that provides radar data;

capturing two or more millimeter wave data frames using the millimeter wave antenna array;

extracting, from the two or more video frames, one or more motion vectors representing the relative motion between the video camera and the object;

determining one or more position estimates and one or more velocity estimates of the object relative to the millimeter wave antenna array using the one or more motion vectors, wherein the one or more velocity estimates are determined using a quantile average determined from the one or more motion vectors and a correction factor associated with the radar data, the correction factor obtained from a training dataset comprising randomly generated velocity profiles;

reconstructing the millimeter wave image using the millimeter wave data frames and the corresponding at least one of the position estimates and the velocity estimates using an image reconstruction algorithm; and controlling a velocity of the conveyor belt or robot based on the reconstructed millimeter wave image to increase an image focus.

12. The method of claim 11 wherein the video frames comprise a compressed video dataset.

13. The method of claim 12 wherein the one or more motion vectors are extracted from the compressed video dataset.

14. The method of claim 12 wherein the compressed video dataset comprises an MPEG video dataset.

15. The method of claim 11 wherein the millimeter wave image comprises a three-dimensional image of the object.

16. The method of claim 11 wherein the position and/or velocity estimates are interpolated between the video frames.

17. The method of claim 11 wherein the moving object has a non-constant velocity.

18. A method for estimating motion of an object in a video, comprising:

receiving at least one recording of an object passing in front of a millimeter wave antenna array, the object transported by a conveyor belt or robot;

receiving radar data from a radar array offset from the millimeter wave antenna array;

determining at least one velocity associated with the object, wherein the at least one velocity is determined using a quantile average determined from at least one motion vector and a correction factor associated with the radar data, the correction factor obtained from a training dataset comprising randomly generated velocity profiles;

receiving, from a distance sensor, at least one measurement of distance from a distance sensor associated with the object;

combining the at least one velocity and the at least one measurement of distance;

based on the combination of the at least one velocity and the at least one measurement of distance, generating a velocity profile of the object;

reconstructing at least one millimeter wave image based on the velocity profile of the object; and controlling a velocity of the conveyor belt or robot based on the reconstructed millimeter wave image to increase an image focus.

19. The method of claim 18, wherein a path and speed of the robot adjust to avoid a collision.

20. The method of claim 18, wherein a speed of the conveyor belt changes according to at least one of a weight of the object, power supplied from a drive motor, or control signals from an upstream or downstream programmable logic control.

* * * * *